Patented Dec. 6, 1949

2,490,179

UNITED STATES PATENT OFFICE 2,490,179

METHOD OF ELECTRIC ARC WELDING

Paul Christiaan van der Willigen, Simon Dirk Boon, and Johannes Holierhoek, Eindhoven, Netherlands, assignors to Hartford National Bank and Trust Company, Hartford, Conn., as trustee No Drawing. Application April 29, 1947, Serial No. 744,784. In the Netherlands September 17, 1946

2 Claims. (Cl. 219—10)

The invention relates to a method of electric arc welding as is used with iron structures, for example, ships, boilers, tanks, railway-carriages, coaches, skeletons of buildings, and so forth; and more particularly that part of structures of this kind, in which a joint between a thin iron plate and either another thin plate or a thick plate is required to be performed.

Thin iron plates are generally welded autogenously, because the use of this method entails less risk of the thin sheet burning through than in the case of electric arc welding, in which this burning through is of comparatively frequent occurrence. This is due to improved controllability of the heat supply owing to improved handling of the burner in autogenous welding and to the intense local evolution of heat in electric arc welding.

The object of the invention is to obviate this disadvantage inherent in electric arc welding. According to the invention this is achieved by using a welding electrode which is constituted by an iron core provided with a coating which is composed of:

| | Per cent by weight |
|---|---|
| $TiO_x$ ($x=2$ or less) | 15 to 40 |
| $CaCO_3$ | 4 to 10 |
| A ferrous alloy | 3 to 8 |
| Clay | 0 to 10 |
| Organic material | 5 to 30 |
| Iron | 30 to 50 |
| KNa silicate | 3 to 9 | external diameter D exceeding $1.175d+1.0$ mm., in which $d$ is the core-wire diameter. Such a welding rod is described in the Dutch patent specification No. 127,405 and the corresponding U. S. patent application Serial No. 745,445, filed May 2, 1947.

The invention relates to a method of electric arc welding of a thin iron sheet not more than 5 mm. in thickness by means of a welding rod of the said kind.

In order that the invention may be more clearly understood it must be observed that the said kind of welding rod exhibits the property of permitting a large length of welding ribbon to be realized; that is to say, the length of welding ribbon obtained by the complete use of a single welding rod. The weld lengths thus obtainable are given in the subjoined table.

| Core diameter of welding rod in mms. x length in cm. | Manner of welding | Length of ribbon | Manner of welding | Length of ribbon |
|---|---|---|---|---|
| 2.5 x 35 | horizontal | 20 | vertical | 30 |
| 3.25 x 35 | tilted | 25 | downward | 45 |
| 4 x 35 | do | 28 | do | 60 |
| 5 x 45 | do | 33 | do | 70 |

In addition it is to be noted that electric arc welding by means of the said kind of welding rod can be readily effected "vertically downwards" and "overhead."

These properties permit favourable results by the use of the invention, it being particularly important that welding of work pieces of the kind comprising a thin iron plate can be readily performed in any welding position. There is, in addition, the resultant advantage that, owing to the said considerable weld lengths, a restricted number of welding rods per work piece suffices, and time is saved. This is so because the time required for changing welding rods is thus reduced. At the same time moreover, a greater quantity of metal is melted down per unit time. In addition, it may be mentioned that the said kind of welding rod permits the use of an identical welding current in any welding position.

The invention is particularly important for involved constructions, so that, for example, there is no longer need for an expedient, such as turning supports, by means of which large work pieces such as carriages or small ships are arranged as a whole to occupy a position allowing to perform "downhand" welding as far as possible. The fact that the invention dispenses with such an expedient is of considerable technically-economical importance.

The said kind of welding rod exhibits the additional advantage for the invention that, as described in the said Dutch and U. S. patent application specifications, it permits of performing vertical downward welding by touch-welding, this being even possible in many welding positions between the horizontal and the vertical positions. This is particularly advantageous for welding thin iron plates according to the invention, because owing to the combination of said touch-welding with the constant arc length thereby involved and the high speed of travel, there is practically no risk of the thin plate burning through.

The invention can be carried out by means of welding rods having a larger core diameter than is the practice in welding structures comprising a thin iron plate. Thus, for example, it is common practice to use a welding rod having a core diameter which is equal to the thickness of the plates for a butt I-weld between thin sheets. According to the invention, this is no longer necessary, so that, for example, for such a butt I-weld between iron sheets 2 mm. in thickness use may be made of a welding electrode having a core diameter of 4 mm. Generally speaking, in carrying out the invention, it is advantageous to use a welding rod, of which the core diameter is up to twice the thickness of the thin iron sheet required to be welded.

For the sake of completeness mention may be made hereinafter of one embodiment of the kind of welding rod required to be used in carrying out the invention, which is also described in the said Dutch and U. S. patent application specifications.

Rutile, 26.5 per cent by weight
Calcareous spar, 7 per cent by weight
Ferrous manganese, 6 per cent by weight
Clay, 7 per cent by weight
Wood flour, 7 per cent by weight
Iron powder, 40 per cent by weight
KNa-silicate, 6.5 per cent by weight
Core wire $d=4.0$ mm.
External diameter $D=7.0$ mm.
Reduced ilmenite ($FeTiO_2$), 45 per cent by weight
Calcareous spar, 7 per cent by weight
Ferrous manganese, 6 per cent by weight
Clay, 7 per cent by weight
Wood flour, 7 per cent by weight
Iron powder, 21.5 per cent by weight
KNa-silicate, 6.5 per cent by weight
Core wire $d=4.0$ mm.
External diamter $D=7.0$ mm.

What we claim is:

1. A method of electric arc welding iron structures comprising welding a thin sheet of iron not more than 5 mm. in thickness by means of a welding rod the iron core of which is provided with a coating composed of:

| | Percent by weight |
|---|---|
| $TiO_x$ ($x=2$ or less) | 15 to 40 |
| $CaCO_3$ | 4 to 10 |
| Ferrous alloy | 3 to 8 |
| Clay | 0 to 10 |
| Organic material | 5 to 30 |
| Iron | 30 to 50 |
| KNa-silicate | 3 to 9 | the external diameter D of the rod exceeding $1.175d+1.0$ mm., in which $d$ is the core diameter and is approximately twice the thickness of the thin iron sheet to be welded.

2. A method as claimed in claim 1 for welding work pieces the position of which can only be varied with the aid of mechanical auxiliary tools, in which a vertical welded joint is required, wherein this welded joint is realized by vertical downward welding.

PAUL CHRISTIAAN van der WILLIGEN.
SIMON DIRK BOON.
JOHANNES HOLIERHOEK.

REFERENCES CITED

The following references are of record in the file of this patent:

UNITED STATES PATENTS

| Number | Name | Date |
|---|---|---|
| 2,053,956 | Humberstone et al. | Sept. 8, 1936 |
| 2,355,988 | Mathias | Aug. 15, 1944 |
| 2,429,175 | Willigen et al. | Oct. 14, 1947 |